July 15, 1969  I. E. ODDO  3,455,287
SPRING ACTUATED DEVICE FOR THROWING SOFT SUBSTANCES
Filed Oct. 8, 1965

INVENTOR
IRENE E. ODDO
BY Cushman, Darby & Cushman
ATTORNEYS

United States Patent Office 3,455,287
Patented July 15, 1969

3,445,287
SPRING ACTUATED DEVICE FOR THROWING
SOFT SUBSTANCES
Irene E. Oddo, Carmel Road, R.R. 1, Box 123,
Hewitt, N.J. 07421
Filed Oct. 8, 1965, Ser. No. 494,201
Int. Cl. F41b 7/00; F41f 7/00; F41c 19/00
U.S. Cl. 124—16                                    6 Claims

ABSTRACT OF THE DISCLOSURE

An amusement device is provided with a flexible liner within a shell so that soft substances can be placed within the liner and expelled from the shell. The liner is rapidly inverted for expulsion of soft substances by a trigger mechanism which releases a compressed spring to effect a rapid movement of the liner.

---

This invention relates to an amusement device and in particular is concerned with a device for propelling the contents of a pie pan out of the pan and toward a target.

Various types of amusement devices have been constructed for manually throwing objects at targets and, additionally, it is a common form of entertainment and amusement to throw a pie at a person in certain types of slapstick routines. However, no device has been developed which will safely propel soft objects at another person for such entertainment purposes.

The present invention provides for a trick pie pan which can be actuated to expel the contents of the pie pan for a sufficient distance to land on another person or some other target. Such a device has utility in amusement and entertainment routines where it is desired to propel a custard pie or some other soft substance across a room and against another performer. The device of this invention also has utility for throwing soap suds or even water for a considerable distance and in this respect it can be safely used in a swimming pool or in any outdoor area where it is desired to engage in this type of amusement.

The invention provides for a pie pan or shell which will contain the particular substance which is intended to be propelled, and a liner is placed within the pie pan to receive the pie or other substance. The liner is made from a flexible material which can be inverted out of the pie pan, and a mechanism is provided for inverting the liner and the pan contents. The expelling mechanism includes a spring assembly which can be triggered to release a disc or plate against the bottom surface of the pan liner. The disc is released at a sufficient tension and for a sufficient distance to snap the liner from its normal position within the pie pan to a completely inverted position outside of the pie pan. The inversion of the liner causes a complete expelling of all contents from the pie pan, and the contents are propelled for a reasonably good distance away from the pan.

Also, a hand grip is provided on the bottom of the pan for containing the actuating assembly and a triggering device. The hand grip prevents the danger of throwing the pan as well as its contents because it is not necessary to move the pan in order to release its contents with the actuating assembly of this invention. By using the device of this invention, a safer form of entertainment and amusement is provide when soft objects are to be thrown toward persons or performers.

Other advantages and features of this invention will become apparent in the more detailed discussion which follows, and in that discussion reference will be made to the accompanying drawings in which.

Figure 1:
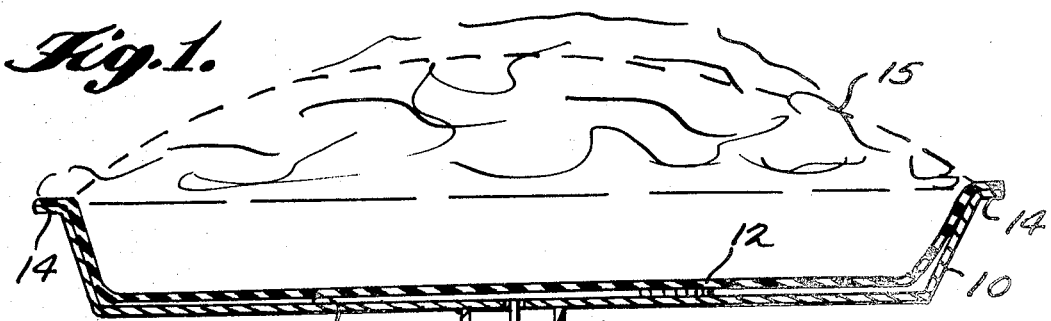
FIGURE 1 is an elevational cross-sectional view of the trick pie pan and actuating assembly associated therewith.
Figure 3:
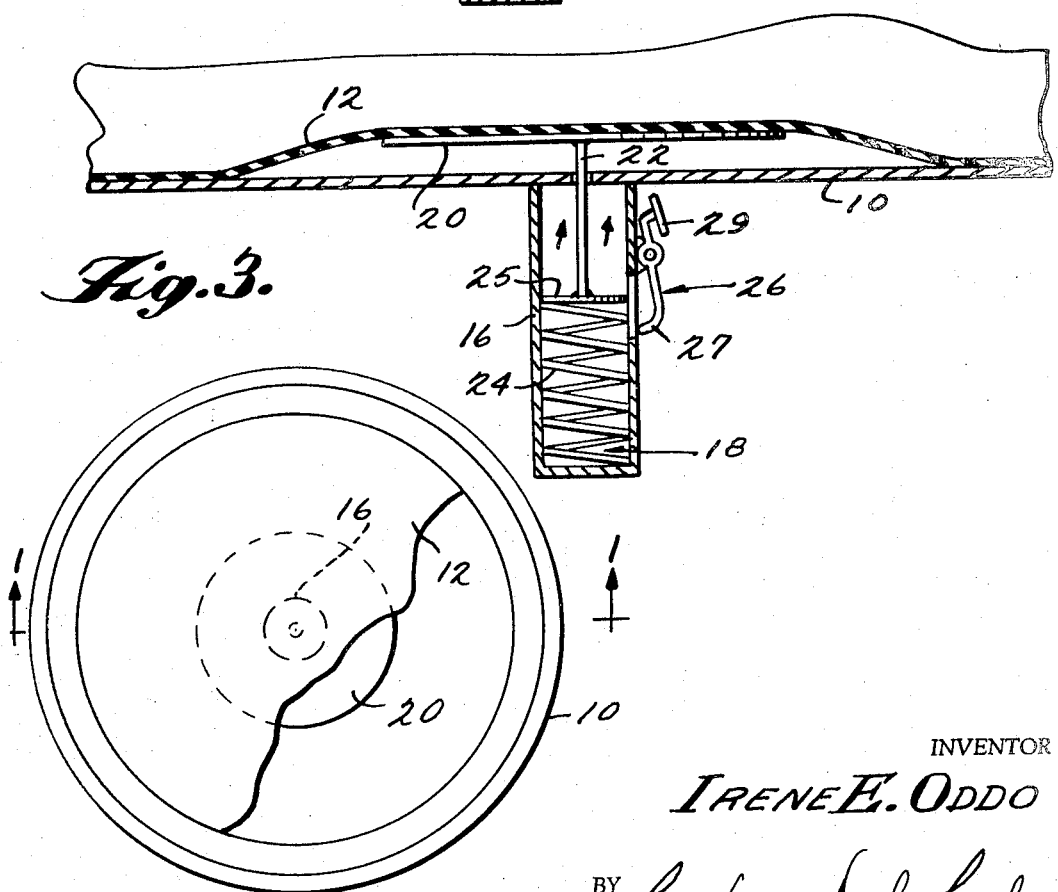
FIGURE 3 is a top plan view showing the relationship of the actuating assembly to the pie pan.

Referring to FIGURES 1 and 3, a pie pan or shell 10 is constructed of a sufficient diameter and depth to contain the particular substance which is to be thrown or propelled by the device of this invention. The pie pan or shell 10 may be made of plastic or metal material and it is constructed with varying depths to accommodate different types of foam materials, soap suds, creams, or the like. A flexible liner 12 is placed within the pie pan 10 so as to completely line the upright side wall and bottom portions of the pan. The flexible liner is secured around its outer periphery to the top edge 14 of the pan and this attachment may be made by suitable adhesives or gripping means which will hold the entire periphery of the liner in contact with the entire periphery of the pie pan. The liner 12 may be made of a plastic or rubber material which will readily invert from its normal position of lining the pie pan to an inverted position indicated by the dotted lines at 15. The liner may also be made of a metal which can be snapped from its normal position to the inverted position so as to propel the contents of the pan away from the pan and through the air.

The pie pan 10 is also provided with a hand grip 16 which is secured to the bottom outside surface of the pie pan and which contains an actuating assembly 18 for quickly inverting the liner 12 of the pan. The hand grip 16 may be of any shape or size to support and contain the actuating assembly and also the hand grip provides for a safe means of holding the pan and preventing the same from being thrown or otherwise lost from the grip of the person who is using the device. The actuating assembly within the hand grip 16 serves to quickly move the liner 12 from its normal position within the pan to its completely inverted position. The assembly includes a disc or plate means 20 which is interposed between the bottom surface of the liner 12 and the bottom inner surface of the pie pan 10. The disc or plate 20 is of such a diameter to effect a rapid movement of the entire liner 12 when the disc is released to move against the bottom surface of the liner. The disc 20 is illustrated as being of a diameter less than that of the pie pan, but of course it may cover the entire bottom of the pie pan so as to contact a greater area of the liner 12. The disc 20 is affixed to and actuated by a shaft means 22 which passes through an opening in the bottom of the pan and into the hand grip 16. The shaft 22 is part of the actuating mechanism, and rapid movement of the shaft upwardly is obtained by the release of a spring 24 contained within the hand grip and actuating assembly. The spring means 24 may be of any conventional design, and includes a coil spring which can be tensioned in its compressed form so as to quickly lift the shaft 22 and the plate 20 when the spring is released. The spring engages a bottom end portion of the shaft 22, and for this purpose a plate means 25 is secured to the bottom end of the shaft 22. The plate or other engaging means 25 is of a sufficient diameter to fit within the hand grip 16 and also to receive and engage the upper end of the spring 24.

Figure 2:
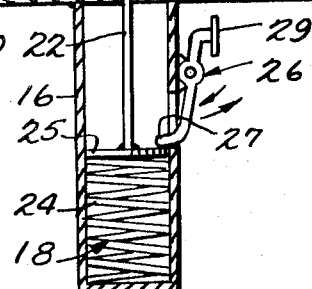
FIGURE 2 is a detailed elevational view of the trigger mechanism for the hand grip and actuating assembly.

As illustrated in FIGURE 2, a trigger mechanism may be included in a convenient location through the hand grip 16 for releasing the spring 24 by an actuation of the trigger 26. The trigger 26 is mounted for pivotal movement from a position which locks the spring 24 into its compressed state to a position which releases the spring for an expelling movement. FIGURE 1 illustrates the locked position of the compressed spring, and it can be seen that a projecting portion 27 of the trigger prevents the upward movement of the plate 25. When the trigger 26 is moved, as by pressing the thumb portion 29, the projecting part 27 of the trigger is moved out of locking engagement with the plate 25, and the compressed spring 24 is free to move the plate 25 rapidly upwardly. This carries the shaft 22 and its liner engaging disc 20 upwardly to discharge the contents of the pie pan.

In use, the pie pan with its liner is cocked by pressing down on the central part of the liner so as to lock the plate 25 below the trigger mechanism. Then the pie pan is filled with a soft substance such as a pie filling, soap or water. The pie pan and its contents can then be carried by the hand grip 16 until it is desired to release the contents and to propel them toward a target. To release the contents, the person holding the pie pan merely moves the trigger 26 with his finger, and the compressed spring 24 is quickly released to raise the disc 20 and to expel the contents from the pie pan. In actual use, the target person may wear protective glasses which are made of plastic or celluloid, and when the pie pan of this invention is marketed a pair of protective glasses and a filling for the pie is included with the trick pie pan device. When it is used in a swimming pool or a lake the pan is set in its cocked position and the user merely fills the pan with water and releases the same by the trigger whenever desired. In expelling or throwing the contents it is not necessary to swing or throw the pan in the direction of the target although a certain amount of swinging motion may be used to assist in a good throw of the contents. When the pan is swung the hand grip 16 assures a safe grip on the pie pan, and there is little likelihood of the pan itself being thrown in the direction of another person.

Having described the amusement device of this invention in a preferred form, it will become apparent that many variations are possible. For example, an extension of the shaft 22 may extend below and externally of the hand grip 16 so that the pie pan can be cocked by merely pulling down on the extension of the shaft 22. Also, other triggering mechanisms may be utilized, and other actuating devices may be used for expelling the contents of the pie pan. Such variations, and others that will be obvious to those skilled in the art, are intended to be included within the scope of the present invention.

What is claimed is:

1. An amusement device for throwing soft substances comprising:
   a container for holding the substance which is to be thrown, said container having a bottom and side walls and an open top;
   a liner carried within said container and covering substantially all of the inner surface of said container; and
   means for rapidly moving said liner upwardly away from the bottom of said container, said means including a spring loaded disc means which can be released to effect a rapid movement of the liner away from the bottom of the container, whereby the substance held within the liner will be expelled out of the container upon upward movement of the liner.

2. The amusement device of claim 1 wherein said container is in the shape of a pie shell, whereby the device can be used for throwing a pie or similar shaped substance.

3. The amusement device of claim 1 wherein said liner comprises a flexible material which can be flexed from a lining position within the container to an inverted position away from the bottom of the container.

4. An amusement device for throwing soft substances comprising:
   a container for holding the substance until it is to be expelled, said container having a bottom and side walls;
   a flexible liner carried within said container for supporting the contents of the container when said liner is moved away from its lining position within the container;
   actuating means for rapidly moving the liner away from its lining position within the container, said actuating means including a triggering means for releasing a spring loaded disc means against the liner of said container so as to lift said liner away from the bottom of the container.

5. The amusement device of claim 4 and including a hand grip attached to a bottom outside wall of the container, and wherein said actuating means is contained within said hand grip, so that the triggering means can be released while the container is being held by the hand grip.

6. The amusement device of claim 4 wherein said container is in the form of a pie pan, whereby pie shaped substances can be thrown from the device.

References Cited
UNITED STATES PATENTS

| | | | |
|---|---|---|---|
| 1,353,380 | 9/1920 | Church | 273—145.5 |
| 3,329,428 | 7/1967 | Morgan | 124—16 X |
| 2,636,738 | 4/1953 | Abagoff | 124—16 X |
| 2,777,436 | 1/1957 | Renner | 124—27 |
| 2,991,589 | 7/1961 | Ayala | 124—41 X |

RICHARD C. PINKHAM, Primary Examiner

WILLIAM R. BROWNE, Assistant Examiner

U.S. Cl. X.R.

124—37, 41